United States Patent Office.

JOHN CUSHINGS, OF WELLINGTON, OHIO.

*Letters Patent No. 106,333, dated August 16, 1870.*

IMPROVEMENT IN COMPOUND FOR CURE OF COUGHS, &c.

The Schedule referred to in these Letters Patent and making part of the same

*To all whom it may concern:*

Be it known that I, JOHN CUSHINGS, of Wellington, in the county of Lorain, in the State of Ohio, have invented certain new and useful Improvements in Remedial Compound for Diseased Lungs, Coughs, and Catarrh, and which consists of the following ingredients, viz:

One gallon of vinegar; eight new eggs; four pounds brown sugar; four ounces black pepper; one-half pound figs.

The above ingredients are compounded as follows:

I take one gallon of pure cider vinegar and place therein eight new-laid eggs; the vinegar being of sufficient strength to dissolve the shells. I then remove all that remains of the eggs, which is the film or membrane inclosing the yolk and albumen, all of which is removed entire, as only the shell is dissolved. This will take about thirty-two hours; after which I add the amount of sugar, pepper, and figs, before stated, which are then placed over a slow fire in a suitable stone or stone-lined vessel, and intimately mixed together, and then boiled until the entire mass is reduced to about one-half the quantity of the original amount put into said vessel, which will be about one-half a gallon.

This compound is then allowed to cool, which is then strained and bottled for use.

The quantity to be taken will depend upon the violence or the activity of the disease, averaging about two or three table-spoonfuls per diem. The proportions herein stated may be altered to a certain extent without changing the nature of the invention.

Claim.

What I claim as my invention, and desire to secure by Letters Patent, is—

The herein-described compound, consisting of the ingredients specified, for the purpose set forth.

JOHN CUSHINGS.

Witnesses:
W. H. BURRIDGE,
J. H. BURRIDGE.